United States Patent
Rossettini et al.

(10) Patent No.: US 11,673,694 B2
(45) Date of Patent: Jun. 13, 2023

(54) METHOD OF RELEASING ARTIFICIAL SATELLITES IN EARTH'S ORBIT

(71) Applicant: D-ORBIT S.P.A., Fino Mornasco (IT)

(72) Inventors: Luca Rossettini, Fino Mornasco (IT); Lorenzo Ferrario, Fino Mornasco (IT); Marco Bevilacqua, Fino Mornasco (IT); Lorenzo Vallini, Fino Mornasco (IT)

(73) Assignee: D-ORBIT S.P.A., Fino Mornasco (IT)

(*) Notice: Subject to any disclaimer, the term of this patent is extended or adjusted under 35 U.S.C. 154(b) by 107 days.

(21) Appl. No.: 16/768,394

(22) PCT Filed: Nov. 29, 2018

(86) PCT No.: PCT/IB2018/059448
§ 371 (c)(1),
(2) Date: May 29, 2020

(87) PCT Pub. No.: WO2019/106591
PCT Pub. Date: Jun. 6, 2019

(65) Prior Publication Data
US 2020/0299004 A1 Sep. 24, 2020

(30) Foreign Application Priority Data
Dec. 1, 2017 (IT) .................. 102017000138579

(51) Int. Cl.
*B64G 1/00* (2006.01)
*B64G 1/10* (2006.01)
*B64G 1/64* (2006.01)

(52) U.S. Cl.
CPC .............. *B64G 1/007* (2013.01); *B64G 1/10* (2013.01); *B64G 1/641* (2013.01); *B64G 1/645* (2013.01); *B64G 2001/643* (2013.01)

(58) Field of Classification Search
CPC .......... B64G 1/007; B64G 1/10; B64G 1/641; B64G 1/645; B64G 2001/643; B64G 1/1085; B64G 2700/00
See application file for complete search history.

(56) References Cited

U.S. PATENT DOCUMENTS 5,178,347 A * 1/1993 Johnson ................. B64G 1/641
244/171.3
5,199,672 A 4/1993 King et al.
(Continued)

FOREIGN PATENT DOCUMENTS

DE 102016108606 A1 11/2017
JP 2000177700 A 6/2000
(Continued)

OTHER PUBLICATIONS

Japanese Office Action dated Aug. 16, 2022, issued in corresponding Japanese application.

*Primary Examiner* — Medhat Badawi
*Assistant Examiner* — Vicente Rodriguez
(74) *Attorney, Agent, or Firm* — Husch Blackwell LLP

(57) ABSTRACT

A method of releasing artificial satellites into Earth's orbit includes providing an orbital transport spacecraft able to move at orbital height and comprising a cargo area, hooking a plurality of satellites in said cargo area, housing said orbital transport spacecraft in a space launcher configured to reach an orbital height, releasing said orbital transport spacecraft at orbital height, when said space launcher reaches orbital height, by imparting a separation thrust to said orbital transport spacecraft, releasing satellites in sequence from the cargo area. The release of each satellite from the cargo area occurs in a respective predetermined direction and upon the orbital transport spacecraft has reached a respective predetermined position.

11 Claims, 4 Drawing Sheets

(56) References Cited

U.S. PATENT DOCUMENTS

| | | | |
|---|---|---|---|
| 6,276,639 B1 | 8/2001 | Hornung et al. | |
| 7,747,361 B2 * | 6/2010 | Kawaguchi | B64G 1/007 244/158.6 |
| 9,463,882 B1 | 10/2016 | Field et al. | |
| 9,546,007 B2 * | 1/2017 | Comtesse | B64G 1/002 |
| 10,807,739 B1 * | 10/2020 | Hawkins | B64G 1/002 |
| 2014/0319283 A1 * | 10/2014 | Holemans | B64G 1/641 244/173.3 |
| 2016/0075452 A1 * | 3/2016 | Robles | B64G 1/641 244/173.3 |
| 2016/0311557 A1 * | 10/2016 | Fuller | B64G 1/242 |
| 2016/0368625 A1 | 12/2016 | Field et al. | |
| 2017/0327253 A1 | 11/2017 | Bogdanov et al. | |
| 2018/0170586 A1 * | 6/2018 | Riskas | B64G 1/641 |
| 2018/0370658 A1 * | 12/2018 | Amimoto | B64G 1/64 |

FOREIGN PATENT DOCUMENTS

| | | |
|---|---|---|
| JP | 2005075209 A | 3/2005 |
| JP | 2011251560 A | 12/2011 |
| JP | 2016060483 A | 4/2016 |
| JP | 2017114159 A | 6/2017 |
| RU | 2192993 C2 | 11/2002 |
| RU | 153436 U1 | 7/2015 |
| WO | 2017046497 A1 | 3/2017 |

\* cited by examiner

METHOD OF RELEASING ARTIFICIAL SATELLITES IN EARTH'S ORBIT

CROSS REFERENCE TO RELATED APPLICATIONS

This application is a U.S. National Phase Application of International Application No. PCT/IB2018/059448 filed on Nov. 29, 2018, which claims priority to Italian Application No. 102017000138579 filed on Dec. 1, 2017. The disclosures of International Application No. PCT/IB2018/059448 and Italian Application No. 102017000138579 are incorporated herein by reference.

TECHNICAL FIELD

The present disclosure relates to a method of releasing artificial satellites into Earth orbit, preferably of small satellites or nanosatellites.

BACKGROUND

In the last decade, technological evolution has led to rapid technological obsolescence of consumer devices and to technology turnover times of the order of a few years. In this regard, the mobile telephony sector can be considered as an example.

In the sector of artificial space satellites, technological development on the contrary tends to advance at a far slower pace, counting on the capability of artificial satellites to last a long time, over 15 years in some cases. The costs to access this space sector can therefore be sustained only by government agencies and by a few large companies, the only ones able to incur the enormous costs of developing artificial satellites and placing them in order.

However, the scientific research needs of research centres and universities have led to new attempts to use space by means of extremely small satellites, that can be built at relatively low cost using the miniaturised electronic technology available on the free market.

In this regard, starting from 1999 the Cal Poly and Stanford universities started to develop and propose as a standard a new satellite, called "Cubesat" because of its particular cubic shape, sized 10×10×10 cm. This type of satellite (that matches the conventional definition of small satellite and more specifically nanosatellite) is a modular satellite and allows to accommodate all the typical subsystems of a larger satellite, relinquishing, however, the performance of the larger and more expensive satellites.

Small satellites and nanosatellites, and in particular their standardised version in CubeSat format, have become very popular and initially used mainly by universities to allow students and researchers to send components and research projects into space.

However, satellites of this type were quickly valued for commercial purposes, and an ever growing number of private companies intuited the value of being able to launch constellations of CubeSats to render services on Earth, mitigating the intrinsic lower performance levels of these satellites with their high number in orbit (up to several hundreds of samples) and with their flight in formation or constellation.

While in the last 60 years approximately 6,000 artificial satellites have been launched, today hundreds of new private companies, supported by private capital, are building and expect to launch more than 23,000 artificial satellites in the next 5-10 years.

CubeSats are transported into space like any other satellite of a higher class with a space launch vehicle. However, their small size makes their dedicated launch uneconomical; for this reason, they have always been placed in orbit as secondary payloads of other, larger satellites. A launcher is typically sold for 60 to 100 million Dollars, so it is difficult for a small satellite, often costing less than a million Euro, to have access to a dedicated launch capacity.

The operators of these small satellites have therefore been "piggybacked" into orbit together with larger satellites, at a cost of a few hundreds of thousands of Dollars, accepting the inability to choose either when to launch, or when to release them into orbit. These decisions are the sole prerogative of the main satellite, for which most of the cost of the launcher is paid.

Cubesats are generally released practically in unison just after the release of the main satellite, constituting a sort of cloud that is slowly dispersed in space.

The Cubesats thus released take months to disperse, since they can only exploit the variation of the Earth's gravitational field and solar wind to change position in orbit and drift until reaching the desired position.

Alternatively, Cubesats are placed in orbit by means of the International Space Station using the Kibo module and a robot arm. Using the robot arm enables operators to choose the time for the extraction of the satellite and to provide the ability to release the Cubesat with different attitudes and force.

From the space station, it is also possible to use the commercial system operated by the company Nanoracks to expel satellites from the International Space Station, with an approach similar to the one applied to the expulsion of the Cubesats from the launch vehicles.

In any case, the number of satellites that can be launched from the International Spatial Station is extremely limited and the release orbit is that of the Space Station, hence at approximately 400 km of altitude and 51.54 degrees of inclination.

This is a severe problem, since most of these small satellites have no on-board propulsion capability.

Operators who desire particular release conditions for their CubeSats have to wait a long time, on average from one to two years, before finding the launch with the orbital parameters suitable for their needs, creating uncertainties and delays that can jeopardise their business.

Moreover, whoever operates constellations of CubeSats must guarantee that their satellites are as equally distanced from each other as possible, to allow a more effective coverage of Earth and provide their customers with a higher-quality service. Nowadays, a constellation of Cubesats released in the course of the same launch takes 6 to 10 months to be fully and uniformly dispersed along the orbit.

Considering that the average lifetime of a CubeSat in orbit is one year and can hardly exceed two years (because of the gradual decay towards Earth due to natural forces that causes its re-entry), it is readily apparent that spending over half the operating life only for the dispersion of the constellation is a critical issue of primary importance between CubeSat operators.

In this context, the present invention proposes making available a method of releasing artificial satellites into Earth orbit that solves the aforementioned critical issues.

SUMMARY

In particular, the present invention relates to a method of releasing artificial satellites into Earth orbit comprising:

providing an orbital transport spacecraft able to move at orbital height and comprising a cargo bay;

hooking a plurality of satellites in said cargo bay;

housing said orbital transport spacecraft in a space launcher configured to reach an orbital height;

releasing said orbital transport spacecraft at orbital height, when said space launcher reaches the orbital height, by imparting a separation thrust to said orbital transport spacecraft;

releasing the satellites from the cargo bay in sequence;

wherein the release of each satellite from the cargo bay occurs in a respective predetermined direction and upon the orbital transport spacecraft has reached a respective predetermined position.

Preferably, the attitude of said orbital transport spacecraft is adjusted prior to the release of each satellite.

Preferably, each satellite is released with respective separation speeds; each separation speed being predetermined such that the released satellite reaches a predetermined orbital position.

Preferably, each satellite is released in a direction opposite to that of the movement of the orbital transport spacecraft.

Preferably, each satellite is released in a direction opposite to that of the release of a satellite released immediately before, wherein the releasing direction of said satellite released immediately before is opposite to the direction of movement of the orbital transport spacecraft.

Preferably, hooking a plurality of satellites in said cargo area comprises providing a plurality of releasing systems and hooking each satellite with one of said releasing systems.

Preferably, said plurality of releasing systems comprises a plurality of releasing pipes, each of which is configured to release one or more satellites separately; said releasing pipes being arranged side by side so as to form a releasing pipe matrix.

Preferably, said satellites are released according to a predetermined release pattern.

Preferably, a propulsion system for the orbital transport spacecraft is activated to position the orbital transport spacecraft in predetermined and subsequent orbital positions every time a satellite is released.

Preferably, the orbital transport spacecraft is moved in an atmospheric entry trajectory after having released all the satellites.

DESCRIPTION OF THE DRAWINGS

Further characteristics and advantages of the present invention will become clearer from the following detailed description of some preferred embodiments thereof, with reference to the appended drawings and provided by way of indicative and non-limiting example. In such drawings.

DETAILED DESCRIPTION

Figure 2:
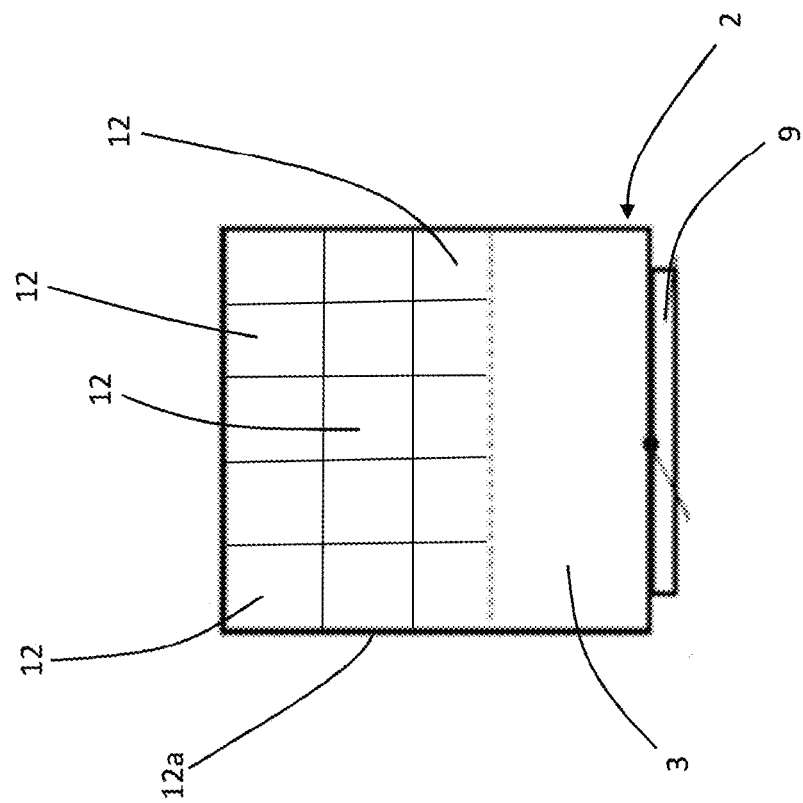
FIG. 2 schematically shows an orbital transport spacecraft.
Figure 1:
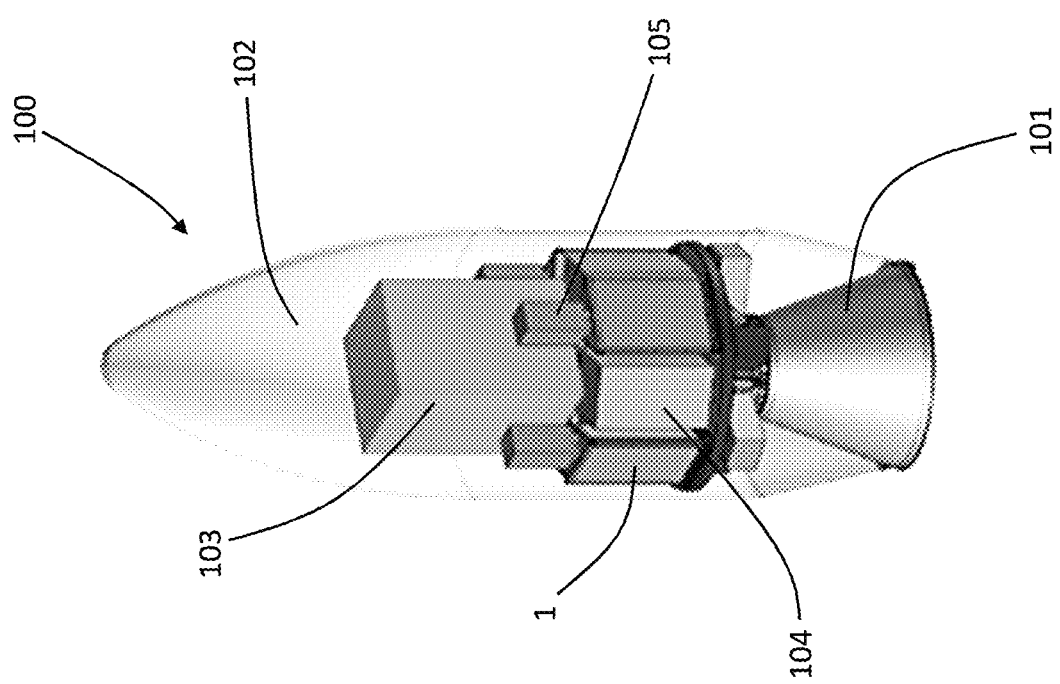
FIG. 1 schematically shows a space launcher.

In FIG. 1, the number 100 indicates a space launcher able to reach an orbital height around the Earth. The space launcher 100 can be a space launch vehicle of the type with vertical take-off which from the Earth's surface is able to reach an orbit around the Earth or a vehicle that, released from an aircraft, is able to reach an orbit around the Earth.

Preferably, the orbital height reached is a low Earth orbit (LEO), i.e. a circular orbit around the Earth at a height between the Earth's atmosphere and the Van Allen belt, between 200 km and 2000 km from the surface of the Earth.

The space launch vehicle 100 comprises a propulsion system 101 (for example a chemical propellant), control and guidance systems (not shown) and a housing compartment 102 for a payload.

Said payload can for example comprise a main satellite 103 and a plurality of secondary satellites 104.

At least one orbital transport spacecraft 1 finds storage space and is housed inside the housing compartment 102.

The orbital transport spacecraft 1 is connected to the space launcher 100 through a conventional orbital separation system 105 configured to release with a predetermined thrust the orbital transport spacecraft 1 once the space launcher 100 reaches a predetermined orbital height.

Preferably, said orbital height is the one adapted for the release of the main satellite 103, i.e. of the main payload of the space launcher 100.

The orbital transport spacecraft 1 comprises a satellite platform 2 which contains all the subsystems necessary for the control and management of a satellite. Said subsystems (not shown or further described because they are conventional) are redundant, i.e. they are duplicated to increase their reliability.

Figure 5:
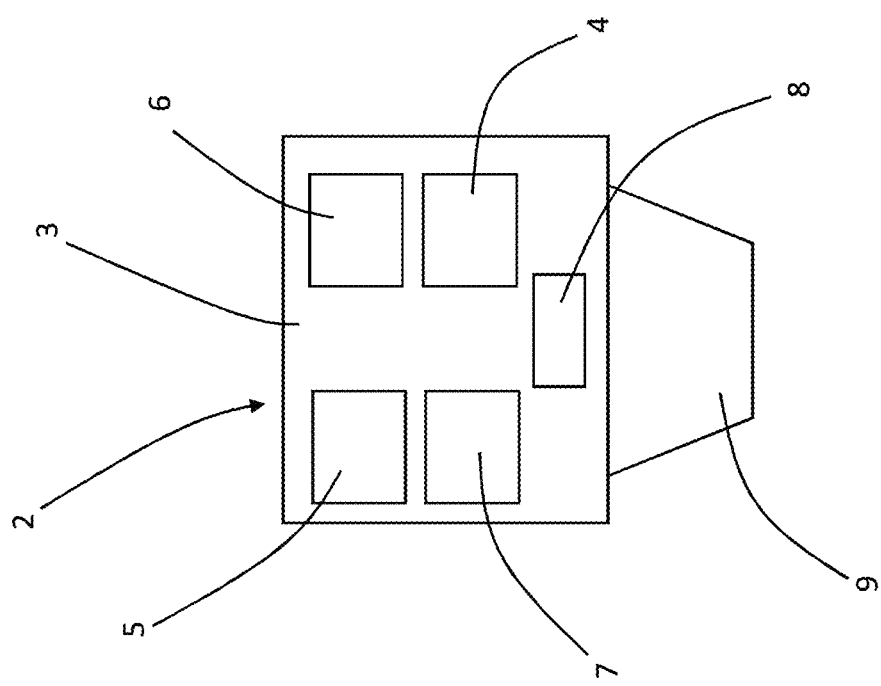
FIG. 5 schematically shows a second component of the orbital transport spacecraft of FIG. 2.

As schematically shown in FIG. 5, the satellite platform 2 further comprises a command and control module 3 powered by a source of electricity 4 (for example a battery) preferably dedicated to the command and control module 3.

The command and control module 3 comprises a signal transmitter 5 able to send signals on the Earth's surface and a signal receiver 6 able to receive signals from the Earth's surface.

The command and control module 3 further comprises a timer 7 and a plurality of driver boards 8 configured to generate and send driver signals 8 to actuator members 15.

The satellite platform 2 further comprises at least one conventional propulsion system 9 configured to move the orbital transport spacecraft 1 along an orbit or to move it to a different orbit. The propulsion system 9 is further configured to correct and/or change the attitude of the orbital transport spacecraft 1.

The orbital transport spacecraft 1 further comprises a mechanical interface 10 whereby the orbital transport spacecraft 1 is connected to the space launcher 100.

The orbital transport spacecraft 1 further comprises a plurality of release systems 20. Each release system 20 comprises a POD (Picosatellite Orbital Deployer) 11 inside which are housed one or more satellites 12. The PODs serve as releasing pipes, with the function of storing, transporting and releasing the satellites 12 that have to be placed in orbit and are preferably housed in a cargo bay 12*a* of the orbital transport spacecraft 1.

The PODs 11 are modular and independent of each other. By way of example, the orbital transport spacecraft 1 can transport 48 Cubesats each of 1 unit (1 Cubesat unit is defined by a volume of 10×10×10 cm), or 16 Cubesats each of 3 units or else 8 Cubesats each of 6 units, or 4 Cubesats each of 12 units and mixed configurations thereof.

Figure 6:
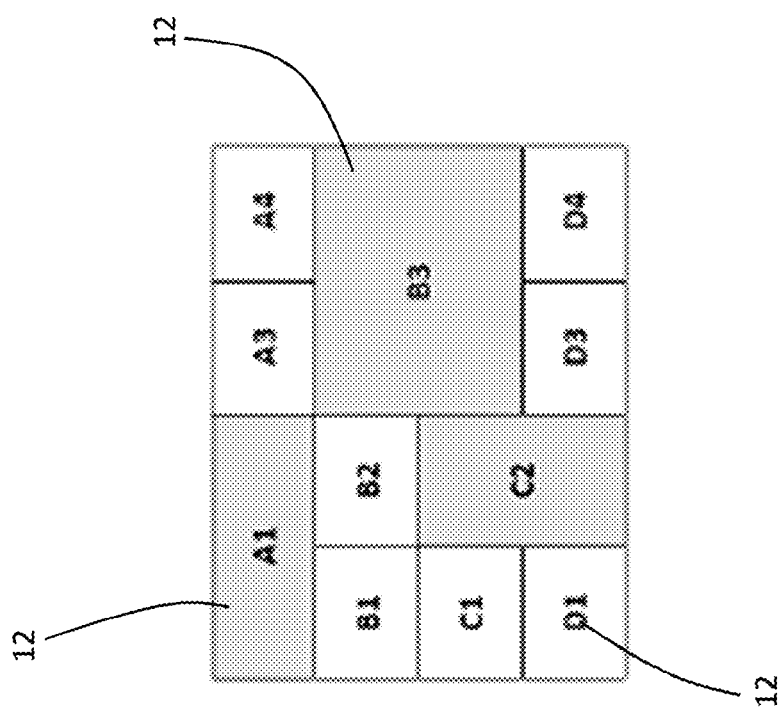
FIG. 6 schematically shows to arrangement of nanosatellites inside the component of FIG. 3.

FIG. 6 shows an example of mixed configuration of Cubesats transported by the orbital transport spacecraft 1, in which A1 and C1 represent respective 6-unit Cubesats, A3, A4, B1, B2, C1, D1, D3, D4 represent respective rows of three Cubesats of 1 unit, B3 represents a 12-unit Cubesat.

Figure 3:
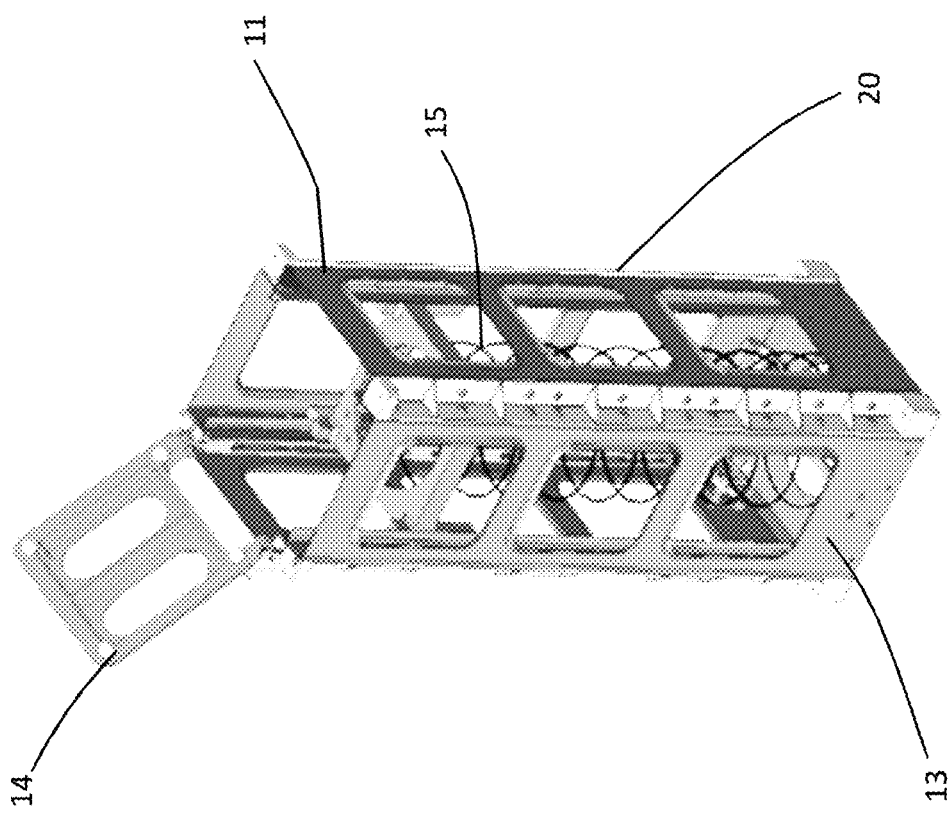
FIG. 3 schematically shows a first component of the orbital transport spacecraft of FIG. 2.

FIG. 3 shows a plurality of PODs 11 in which each POD is able to house a 3-unit Cubesat. The PODs 11 can be powered by photovoltaic panels 11a installed on the structure of the PODs themselves, or, more preferably, they are powered by the satellite platform 2 of the orbital transport spacecraft 1.

Figure 4:
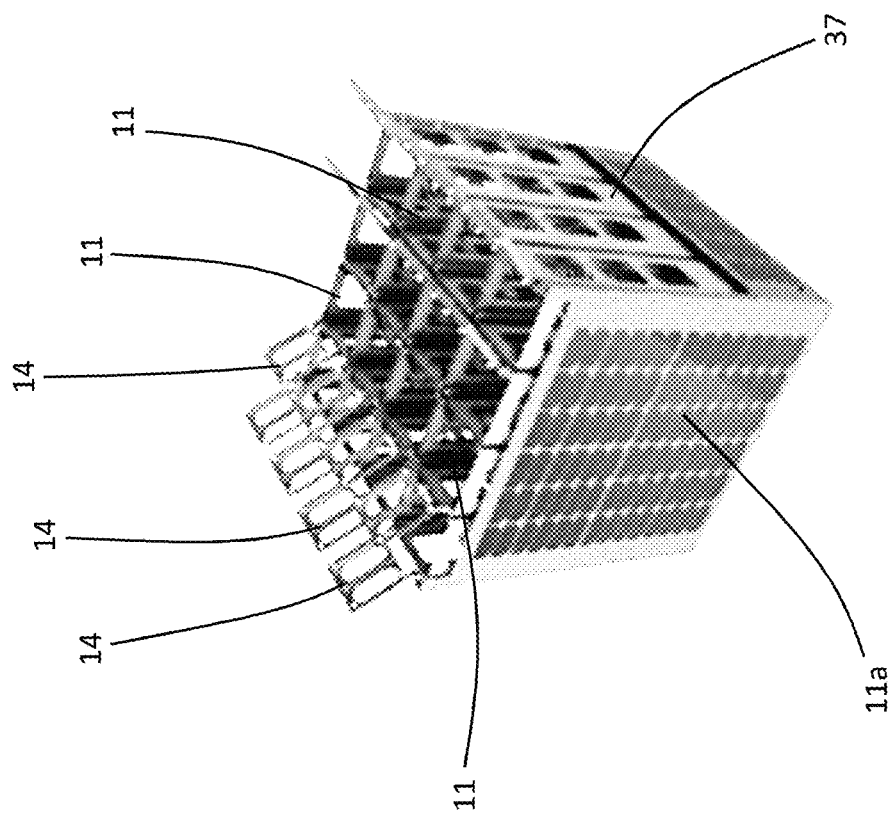
FIG. 4 shows a detail of the component of FIG. 3.

As shown in FIG. 4 (which shows a POD for the transport and release of a 3-unit Cubesat), each POD is provided with a containment casing 13, an opening door 14 and actuator members 15 to expel the Cubesats transported imparting a predetermined thrust to them.

Said actuator members 15 can for example be springs preloaded according to the thrust to be imparted to the satellite at the time of the release.

The PODs 11 are arranged mutually side by side to form a matrix of PODs in which, preferably, all opening doors 14 lie with the same orientation and are coplanar, as shown in FIG. 3.

According to the method of the present invention, the orbital transport spacecraft 1 is equipped with the satellites 12 inserted in the PODs 11 and then housed in the space launcher 100.

The space launcher 100 is placed in orbit around the Earth. The orbital height and the position reached by the space launcher 100 is usually the one specifically prescribed for the release of the main satellite 103 which represents the most important payload of the space launcher and for which the space mission was mainly conceived.

At this point, the orbital transport spacecraft 1 is released by the space launcher 100. The releasing step occurs imparting a separation thrust to the orbital transport spacecraft 1 able to remove the orbital transport spacecraft 1 from the space launcher 100. Said thrust gives the transport spacecraft 1 a momentum that, depending on current regulations and/or on the mission parameters, is able to move the orbital transport spacecraft 1 into the orbit reached for a time interval of a few days (usually 2 or 3 days).

Note that in this step the propulsion system 9 of the orbital transport spacecraft 1 is not activated.

Alternatively, if the orbital transport spacecraft 1 has to reach a different orbital height or if it is necessary to impart to the orbital transport spacecraft 1 a greater momentum than that imparted by the separation thrust, the propulsion system 9 is activated.

In any case, the orbital transport spacecraft 1 then moves away from the space launcher 100.

When the orbital transport spacecraft 1 reaches a first predetermined position, a first satellite 12 is released.

Said predetermined position is calculated according to the position in which the satellite 12 has to be placed in orbit.

The satellite 12 is released imparting a separation thrust thereto. Said separation thrust can for example be imparted by the actuator members 15 of the POD. Said separation thrust is preferably predetermined when planning the mission and then pre-set. Alternatively, said separation thrust can be determined at the time of release of the satellite 12 according to the exact position reached by the orbital transport spacecraft 1 (which could differ from the positions specified when planning the mission).

In any case, the satellite 12 moves away from the orbital transport spacecraft 1 in a pre-set and pre-calculated direction, with a separation speed that assures the attainment of the desired position without requiring additional manoeuvres. In this way, the satellite 12 can be positioned even if it is not provided with an autonomous propulsion system.

Before the release of the satellite 12, to assure that said satellite moves away in the selected direction, the propulsion system 9 of the orbital transport spacecraft 1 is activated to correct the attitude of the orbital transport spacecraft 1.

In the preferred embodiment of the invention, the satellite 12 is released in a direction opposite to that of the movement of the orbital transport spacecraft 1.

Once the first satellite is released, the orbital transport spacecraft 1 reaches a new release position and the operations for releasing an additional satellite 12 are repeated as described above.

Figure 7:
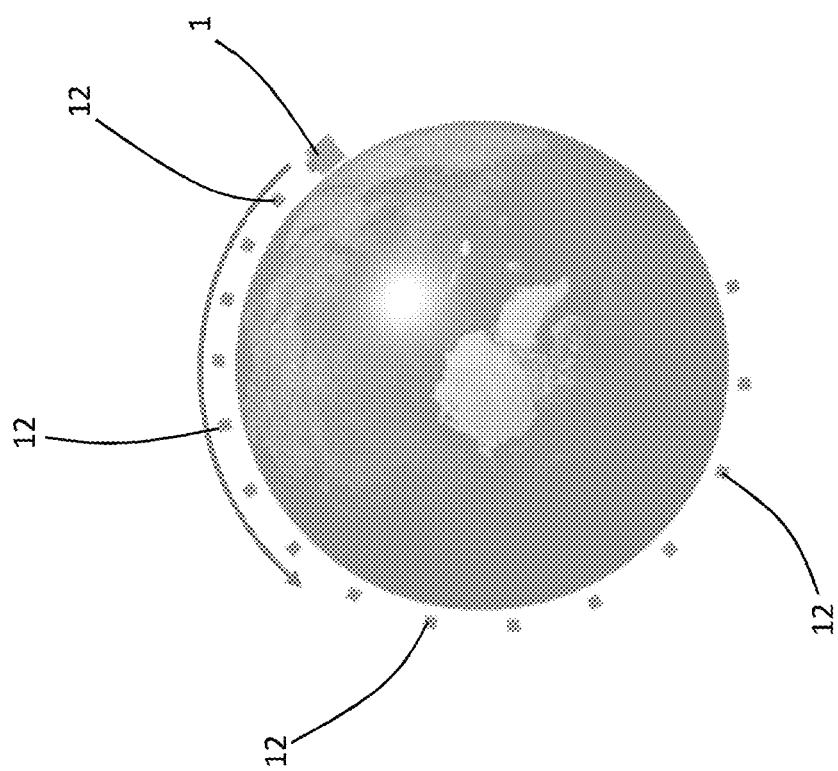
FIGS. 7 and 8 show two examples of orbital positioning of satellites according to the present invention.

In this way, a gradual release of the satellites 12 in a direction opposite to that of the movement of the orbital transport spacecraft 1 along the orbit is assured, without requiring additional manoeuvres on the part of the satellites 12 (as shown schematically in FIG. 7). This allows to have a release, for example, of 16 satellites in approximately 88 days.

The release sequence of the satellites 12 can be pre-set or decided case by case according to the needs of the operator of the satellites 12.

Figure 8:
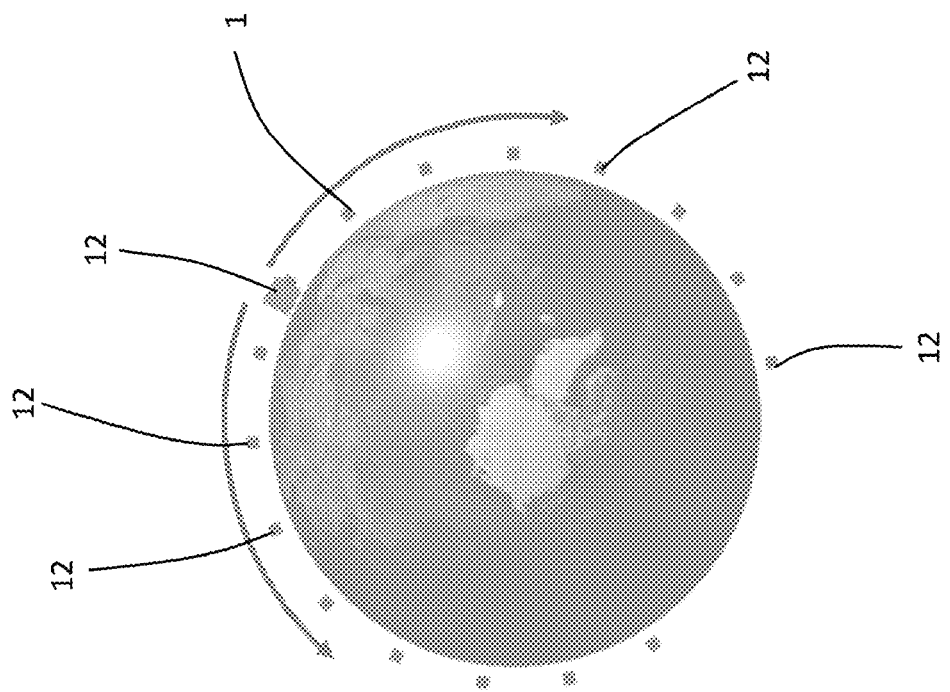

Alternatively, two satellites 12 released successively are released in substantially mutually opposite directions. Each release follows the steps described above, with the difference that the second satellite 12 is released in a direction matching the orbital direction of advance of the orbital transport spacecraft 1, after reorienting the orbital transport spacecraft 1, as schematically shown in FIG. 8.

The Applicant has calculated that in this way it is possible to reduce the total release time of the satellites 12 by 35% compared to a release sequence in which the directions of removal of the satellites are always directed in the opposite direction to that of advance of the orbital transport spacecraft 1.

The separation thrusts and the correlated separation speeds of the satellites 12 can be different from each other and, as stated, they are selected to assure the correct positioning of the satellites 12 in the shortest possible time.

At the end of the positioning of the satellites 12, the orbital transport spacecraft 1 is placed on an atmospheric entry trajectory, avoiding its becoming a dangerous, uncontrolled object in orbit.

This operation can be carried out using the residual propellant and the propulsion system used for manoeuvres in orbit or using a dedicated propulsion system configured to carry out only the atmospheric re-entry operations.

Obviously, a person skilled in the art, to meet specific and contingent needs, may make numerous modifications and variants to the invention described above, without thereby departing from the scope of protection of the present invention as defined by the following claims.

The invention claimed is:

1. A method of releasing artificial satellites into Earth's orbit, comprising the steps of:
   providing an orbital transport spacecraft able to move at orbital height and comprising a cargo area;
   providing a plurality of release systems housed in said cargo area, wherein each release system comprises a POD (Picosatellite Orbital Deployer);
   housing a plurality of satellites inside said PODs, wherein said PODs are configured for housing, transporting and releasing said plurality of satellites;
   housing said orbital transport spacecraft in a space launcher configured to reach an orbital height;

releasing said orbital transport spacecraft at orbital height, when said space launcher reaches orbital height, by imparting a separation thrust to said orbital transport spacecraft;

releasing satellites in sequence from the cargo area through said PODs;

wherein the release of each satellite from the cargo area occurs in a respective predetermined direction and upon the orbital transport spacecraft has reached a respective predetermined position; and wherein each two satellites released successively of the plurality of satellites are released in substantially mutually opposite directions, wherein a first satellite of the two satellites is released in a direction contrary to an orbital direction of advance of the orbital transport spacecraft and the second satellite of the two satellites is released in a direction matching the orbital direction of advance of the orbital transport spacecraft.

2. A method of releasing artificial satellites into Earth's orbit, comprising the steps of:

providing an orbital transport spacecraft able to move at orbital height and comprising a cargo area;

providing a plurality of release systems housed in said cargo area;

securing a plurality of satellites in said cargo area;

housing said orbital transport spacecraft in a space launcher configured to reach an orbital height;

releasing said orbital transport spacecraft at orbital height, when said space launcher reaches orbital height, by imparting a separation thrust to said orbital transport spacecraft;

releasing satellites in sequence from the cargo area;

wherein the release of each satellite from the cargo area occurs in a respective predetermined direction and upon the orbital transport spacecraft has reached a respective predetermined position;

wherein each two satellites released successively of the plurality of satellites are released in substantially mutually opposite directions, wherein a first satellite of the two satellites is released in a direction contrary to an orbital direction of advance of the orbital transport spacecraft and the second satellite of the two satellites is released in a direction matching the orbital direction of advance of the orbital transport spacecraft.

3. The method according to claim 2, wherein an attitude of said orbital transport spacecraft is adjusted prior to the release of each satellite.

4. The method according to claim 2, wherein each satellite is released with respective separation speeds; wherein each separation speed is predetermined such that the released satellite reaches a predetermined orbital position.

5. The method according to claim 2, wherein each release system of said plurality of release systems comprises a POD (Picosatellite Orbital Deployer) configured for housing, transporting and releasing one or more satellites of said plurality of satellites.

6. The method according to claim 5, wherein said PODs are arranged side by side so as to form a matrix of PODs.

7. The method according to claim 5, wherein each POD is provided with a containment casing, an opening door and actuator members to expel the one or more satellites by imparting a predetermined thrust to them.

8. The method according to claim 5, wherein each POD houses more than one satellite of said plurality of satellites.

9. The method according to claim 2, wherein each of said plurality of satellites are released according to a predetermined release pattern.

10. The method according to claim 2, comprising activating a propulsion system for the orbital transport spacecraft to position the orbital transport spacecraft in predetermined and subsequent orbital positions every time one satellite of said plurality of satellites is released.

11. The method according to claim 2, comprising moving the orbital transport spacecraft in an atmospheric entry trajectory after having released all of the plurality of satellites.

* * * * *